United States Patent
Sen et al.

(10) Patent No.: US 7,532,613 B1
(45) Date of Patent: May 12, 2009

(54) ESTABLISHING A COMMUNICATIONS SESSION HAVING A QUALITY OF SERVICE IN A COMMUNICATIONS SYSTEM

(75) Inventors: Sanjoy Sen, Plano, TX (US); Jayshree A. Bharatia, Plano, TX (US); Glenn C. Morrow, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 2039 days.

(21) Appl. No.: 09/605,800

(22) Filed: Jun. 28, 2000

Related U.S. Application Data

(60) Provisional application No. 60/159,332, filed on Oct. 14, 1999.

(51) Int. Cl.
*H04L 12/66* (2006.01)

(52) U.S. Cl. .................................. 370/352; 370/252

(58) Field of Classification Search ................ 370/338, 370/352, 401, 410, 252, 328
See application file for complete search history.

(56) References Cited

U.S. PATENT DOCUMENTS

| | | | | |
|---|---|---|---|---|
| 6,091,709 | A * | 7/2000 | Harrison et al. | 370/235 |
| 6,286,052 | B1 * | 9/2001 | McCloghrie et al. | 709/238 |
| 6,320,873 | B1 * | 11/2001 | Nevo et al. | 370/466 |
| 6,385,193 | B1 * | 5/2002 | Civanlar et al. | 370/352 |
| 6,389,008 | B1 * | 5/2002 | Lupien et al. | 370/352 |
| 6,392,996 | B1 * | 5/2002 | Hjalmtysson | 370/252 |
| 6,463,055 | B1 * | 10/2002 | Lupien et al. | 370/353 |
| 6,519,252 | B2 * | 2/2003 | Sallberg | 370/356 |
| 6,519,254 | B1 * | 2/2003 | Chuah et al. | 370/389 |
| 6,529,958 | B1 * | 3/2003 | Oba et al. | 709/237 |
| 6,563,793 | B1 * | 5/2003 | Golden et al. | 370/236 |
| 6,584,098 | B1 * | 6/2003 | Dutnall | 370/354 |
| 6,614,791 | B1 * | 9/2003 | Luciani et al. | 370/395.53 |
| 6,636,502 | B1 * | 10/2003 | Lager et al. | 370/352 |

(Continued)

FOREIGN PATENT DOCUMENTS

WO    WO 99 05828 A    2/1999

(Continued)

OTHER PUBLICATIONS

R. Braden et al., Network Working Group, Request for Comments 2205, "Resource ReSerVation Protocol (RSVP)—Version 1 Functional Specification", Sep. 1997, pp. 1-109.

(Continued)

*Primary Examiner*—Ricky Ngo
*Assistant Examiner*—Christine Ng
(74) *Attorney, Agent, or Firm*—Trop, Pruner & Hu, P.C.

(57) ABSTRACT

A communications system includes a packet-based wireless network linked to mobile units and a circuit-switched network such as a public-switched telephone network (PSTN). A primary Packet Data Protocol (PDP) context is established with call setup that contains the default quality of service (QoS) profile of the call session. However, to support multiple flows with different QoS profiles, secondary PDP contexts with different QoS profiles may be activated in the call session. The secondary PDP context activation may be performed using messaging according to a protocol for reserving resources, such as the Resource Reservation Protocol (RSVP).

40 Claims, 7 Drawing Sheets

U.S. PATENT DOCUMENTS

| | | | |
|---|---|---|---|
| 6,661,782 B1 * | 12/2003 | Mustajarvi et al. | 370/331 |
| 6,690,647 B1 * | 2/2004 | Tang et al. | 370/235 |
| 6,728,365 B1 * | 4/2004 | Li et al. | 379/329 |
| 6,751,190 B1 * | 6/2004 | Swallow | 370/217 |
| 6,937,566 B1 * | 8/2005 | Forslow | 370/231 |
| 2003/0039237 A1 * | 2/2003 | Forslow | 370/352 |

FOREIGN PATENT DOCUMENTS

| | | | |
|---|---|---|---|
| WO | WO9905828 | * | 2/1999 |
| WO | WO 9905828 A1 | * | 2/1999 |

OTHER PUBLICATIONS

S. Sen, Nortel Networks, "Usage of RSVP Signaling in 3G.I0", Sep. 14, 1999.

S. Herzog et al., Network Working Group, Request for Comments 2749, "COPS Usage for RSVP", Jan. 2000, pp. 1-16.

D. Durham et al., Network Working Group, Request for Comments 2748, "The COPS (Common Open Policy Service) Protocol", Jan. 2000, pp. 1-35.

Draft Technical Report "3rd Generation Partnership Project; Technical Specification Group Services and System Aspects QoS Concept and Architecture", 3G TR 23.907 Version 1.43.0 (May 1999).

Proposed Change Request, Technical Specification GSM/UMTS 03.60, Version 7.0.0, "Enhanced QoS Support in GPRS", 1999.

The Quality of Service Forum, "The IP QoS FAQ", Stardust Forums, Inc. 1995-1999.

J. Wroclawski, Network Working Group, Request for Comments 2210, "The Use of RSVP With IETF Integrated Services", Sep. 1997, pp. 1-31.

J. Wroclawski, Network Working Group, Request for Comments 2211, "Specification of the Controlled-Load Network Element Service", Sep. 1997, pp. 1-18.

S. Blake et al., Network Working Group, Request for Comments 2475, "An Architecture for Differentiated Services", Dec. 1998, pp. 1-34.

"QoS Requirements", S2 Ad Hoc Agenda Item, Aug. 23-27, 1999.

G. Morrow, Nortel Networks, "Transaction Negotiation and Ringback Optimization Considerations", 3G.IP/99.09.14.31, Sep. 14, 1999, pp. 1-10.

Y. Bernet et al., Windows Networking Group, "Winsock Generic QoS Mapping", draft, GQOS_SPEC.doc, Version 3.1, Sep. 21, 1998, pp. 1-91.

M.A. Salman, "The Fugure of IP-PSTN Interworking", Utrecht, N., Aug. 24-28, 1999, London, IBTE.

L-P. Anquetil et al., "Media Gateway Control Protocol and Voice Over IP Gateways. MGCP and VOIP Gateways Will Offer Seamless Internetworking of New VOIP Networks With Today's Telephone Networks" Electrical Communication, Alcatel, Brussels, Apr. 1, 1999.

*3GPP: "3G TS 23.060 DRAFT 2 Version 3.1.0 General Radio Packet Service (GPRS); Service Description; Stage 2", Technical Specification, Sep. 1999, vol. V3.1.0., pp. 1-136.*

* cited by examiner

ESTABLISHING A COMMUNICATIONS SESSION HAVING A QUALITY OF SERVICE IN A COMMUNICATIONS SYSTEM

This application claims priority under 35 U.S.C. § 119(e) to U.S. Provisional Application Ser. No. 60/159,332, entitled "Establishing a Communications Session with a Predetermined Quality of Service in a Mobile Communications System," filed Oct. 14, 1999.

BACKGROUND

The invention relates to establishing a packet communications session having a quality of service in a communications system.

Mobile communications systems, such as cellular or personal communications services (PCS systems), are made up of a plurality of cells. Each cell includes a radio base station, with each base station connected to a mobile switching center that controls processing of calls between or among mobile units or mobile units and wireline units tied to a public switched telephone network (PSTN).

Traditionally, mobile communications systems have been implemented as circuit-switched networks. In a circuit-switched network, a line between two end points of (e.g., two mobile units) is occupied for the duration of the connection between the end points. Such a connection is optimum for communications that are relatively continuous, such as speech. However, data networks such as intranets and the Internet use packet-based connections, in which communications between nodes on a link is by data packets. In such data networks, each node occupies the communications link only for as long as the node needs to send or receive a data packet.

Several packet-based wireless protocols have been proposed to provide more efficient connections between a mobile unit and a packet-based data network, such as Internet Protocol (IP) networks. One such protocol is the General Packet Radio Service (GPRS) protocol, which complements existing GSM (Global System for Mobile) communications systems. Other technologies that build upon GPRS are the Enhanced GPRS (EGPRS) technology (also referred to as Enhanced Data Rate for Global Evolution or EDGE) and EGPRS Compact (or EDGE Compact) technology, which offer higher data rates and complement GSM and IS-136 systems. Packet-based communications, such as IP communications, can thus be communicated over a wireless infrastructure enabled for such packet services. A mobile unit that is "packet-enabled" can thus more efficiently access traditional wired packet-based networks, including the Internet and local area networks (LAN) and wide area networks (WAN).

With the increased capacity and availability of packet-based data networks, the types of services that are available over such networks have increased. Traditional forms of communications across packet-based data networks include electronic mail, file transfer, web browsing, and other exchanges of digital data. However, more recently, audio and video communications (e.g., voice communications, video conferencing, multicast of multimedia data) have become possible. Voice communications over packet-based data networks are unlike voice communications in a conventional PSTN system, which provides users with dedicated, end-to-end circuit connections for the duration of each call. Voice and other forms of streaming data sent over a packet-based data network have to share the network bandwidth with conventional non-streaming data.

In a packet-based data network, such as an IP (Internet Protocol) network, transmission speeds of the various packets may vary widely depending on the usage of data networks over which the data packets are transferred. During periods of high usage of data networks, delays on the transfer of voice or other streaming data packets may cause poor performance of such communications. Voice data packets that are lost or delayed due to inadequate or unavailable capacity of data networks may result in gaps, silence, and clipping of audio at the receiving end.

To enhance communications that involve streaming data (such as voice or video conferencing) over data networks, a Resource Reservation Protocol (RSVP), as described in Request For Comments (RFC) 2205, entitled "Resource Reservation Protocol (RSVP)," dated Sep. 19, 1997, has been proposed to identify and reserve resources for traffic over a data network. By reserving such resources along nodes in the path of communications, some level of quality of service (QoS) may be provided to a user to enhance the user's experience in using the data network for various types of communications, including communications of audio and/or video data.

A node, whether fixed or mobile, may have various applications that provide for different types of communications over the data network. For example, communications such as electronic mail and web browsing may have low QoS requirements, whereas communications such as audio or video conferencing may have high QoS requirements. Thus, because of the different possible types of communications, support for multiple concurrent flows with different QoS requirements may be needed. A QoS profile may be defined in a Packet Data Protocol (PDP) context. A primary PDP context may be associated with an IP address of the mobile node. To support multiple QoS flows per IP address, one or more secondary PDP contexts or PDP sub-contexts may be created for the mobile node. Given a primary PDP context, a mobile node can activate multiple secondary PDP contexts with different QoS profiles as and when required.

The end points of a packet-based communications session may include a mobile unit linked to a packet-based wireless network and a terminal connected to a circuit-switched network, such as the PSTN. To enable such a communications session, a media gateway is provided between the packet-based wireless network and the circuit-switched network. The media gateway performs the translation between packet-based signals and circuit-switched signals. Although QoS is defined for packet-based networks, whether wired or wireless, QoS is not available in circuit-switched networks.

A need thus exists for a mechanism and method to provide for QoS in communications sessions between mobile units linked to packet-based wireless networks and terminals connected to a circuit-switched network.

SUMMARY

In general, according to one embodiment, a method of establishing a communications session between a mobile unit and a terminal coupled to a circuit-switched network includes receiving a message originated by the mobile unit that contains information related to reserving network resources and receiving a message from a device designated as a terminating device for quality of service signaling on behalf of the terminal. An indication is sent to establish a context identifying a quality of service for the communications session.

Some embodiments of the invention may include one or more of the following advantages. A flexible and convenient method and mechanism is provided to establish quality of service (QoS) in a wireless network that supports packet-based communications services. QoS may be defined for communications between mobile units or communications between a mobile unit and a terminal connected to a circuit-switched network. By providing QoS in packet-based wireless networks, enhanced quality levels may be provided for streaming data such as audio or video data.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
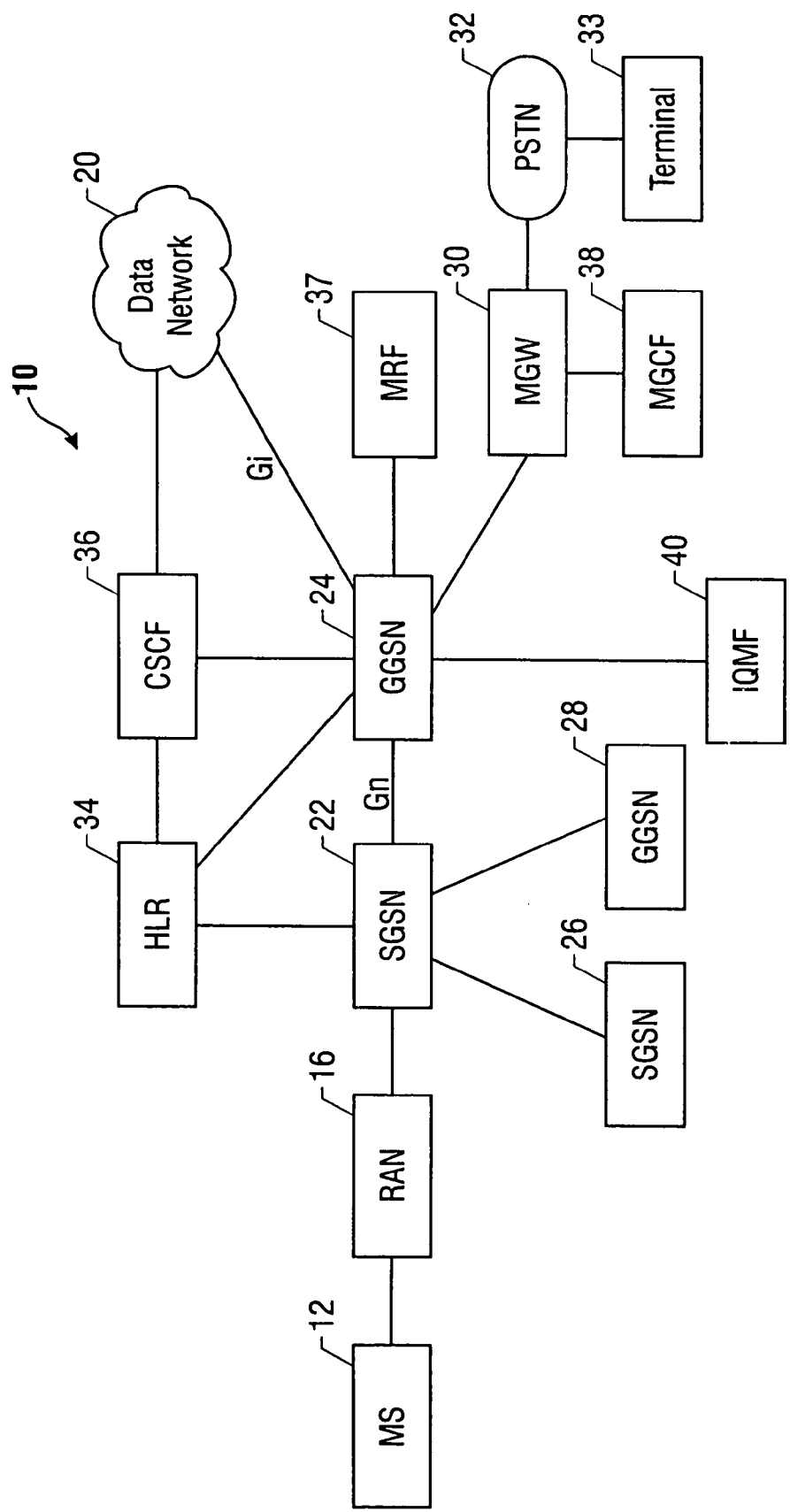
FIG. 1 is a block diagram of an embodiment of a communications system including a packet-based wireless network and a circuit-switched network.

Referring to FIG. 1, a communications system 10 includes a packet-based wireless network. Mobile units 12 are coupled through corresponding radio access networks 16 to a serving GPRS support node (SGSN) 22 in the packet-based wireless network. Communications in the packet-based wireless network may be according to a General Packet Radio Service (GPRS) protocol, or alternatively, to an Enhanced General Packet Radio Service (EGPRS) protocol (Enhanced Data Rate for Global Evolution or EDGE) or EGPRS Compact protocol (or EDGE Compact). The GPRS or EGPRS protocol provides packet-based wireless links to a wired packet-based data network 20, such as an Internet Protocol (IP) network 20. One version of IP is described in Request for Comments (RFC) 791, entitled "Internet Protocol," dated September 1981. Other versions of IP, such as IPv6 or other connectionless, packet-switched standards may also be utilized in further embodiments. A version of IPv6 is described in RFC 2460, entitled "Internet Protocol, Version 6 (IPv6) Specification," dated December 1998.

In accordance to further embodiments, instead of GPRS, EGPRS, or EGPRS Compact, other protocols (such as IS-2000 or W-CDMA) to enable packet-based wireless links between mobile units and a packet-based data network may also be used.

The SGSN 22 is coupled through a Gn link to a gateway GPRS support node (GGSN) 24, which is the interface to the packet-based data network 20. The SGSN 22 may be coupled to other SGSNs, such as SGSN 26. The SGSN 22 may also be coupled to other GGSNs, such as GGSN 28. As used here, the infrastructure including the RANs, SGSNs, GGSNs, and other related entities are part of the packet-based wireless network.

A media gateway 30 provides an interface between the wireless network and a circuit-switched network such as a public switched telephone network (PSTN) 32. Thus, the mobile unit 12 may be capable of establishing a communications session with a terminal 33 coupled to the PSTN 32. Although not shown in FIG. 1, a network cloud may be present between the GGSN 24 and the media gateway 30. Such a network cloud may be part of the data network 20 and may include a number of routers.

The path through the SGSN 22, GGSN 24, and any other routers to the media gateway 30 or the data network 20 includes resources that are shared by various communications sessions involving multiple units. Such resources may have to be reserved to provide some desired level of quality of service (QoS) for active communications sessions.

In accordance with some embodiments, QoS may be defined for a communications session between a mobile unit coupled to the packet-based wireless network and a terminal coupled to a circuit-switched network (referred to as a "circuit-switched terminal"). In fact, in an established communications session, multiple concurrent flows (e.g., IP flows) with different QoS requirements between a mobile unit and the circuit-switched terminal may be supported. A flow refers to the exchange of data in a communications session between two end points. A flow may be defined by a tuple <source address, destination address, source port, destination port, protocol ID>. Each flow may be associated with a specific QoS. Multiple flows may be active and may be associated with different QoS requirements.

In one embodiment, a QoS profile for a mobile unit is specified in a Packet Data Protocol (PDP) context, which is associated with one IP address of the mobile unit. Hence, in order to support multiple QoS flows per IP address, one primary PDP context and one or more secondary PDP contexts or PDP sub-contexts for the mobile unit may be created. Given one primary PDP context, the mobile unit can activate multiple secondary PDP contexts or PDP sub-contexts with different QoS profiles as and when required.

A PDP context may contain the following information. The PDP type may be specified, which may identify IP, X.25, or PPP (Point-to-Point Protocol) as the packet data protocol. The PDP address is also contained in the PDP context, as is a QoS profile that identifies the QoS profile requested or negotiated for a given flow. When a communications session is first established, a primary PDP context is activated, which contains the default QoS profile. If different QoS profiles are desired for different flows (e.g., e-mail traffic, audio or video conferencing, and so forth) in the communications session, then PDP sub-contexts may be activated with different QoS profiles.

In accordance some embodiments, an activation mechanism that utilizes available signaling techniques is used to activate PDP sub-contexts. One example of such a signaling technique includes signaling defined by the Resource Reservation Protocol (RSVP). One version of RSVP is described in RFC 2205, entitled "Resource Reservation Protocol (RSVP)," dated September 1997, and hereby incorporated by reference. Thus, RSVP signaling may be used to initiate PDP sub-context activation (and optionally resource reservation) for calls between a mobile unit and a unit coupled to the PSTN 32 or other circuit-switched networks.

RSVP is a signaling protocol used for resource reservation to enable the allocation of different levels of service to different users. RSVP can be used to offer a service discrimination for delay sensitive applications by explicit allocation of resources in the network. RSVP provides a type of circuit-emulation in packet-switched networks, such as IP networks. Under RSVP, an RSVP-enabled sender is able to characterize outgoing traffic in terms of bandwidth, delay and jitter in predetermined messages. Each RSVP-enabled router along the downstream route establishes a path state based on received RSVP information. In response, receivers send back messages that include the QoS level required.

One advantage of using RSVP signaling is that RSVP is already part of some operating systems, such as WINDOWS® 98 or WINDOWS® NT. Such operating systems may also provide application programming interfaces (APIs) for QoS. For example, WINDOWS® 98 and WINDOWS® NT include QoS (Generic QoS or GQoS) APIs. GQoS APIs are described in Yoram Bernet et al., "Windows Networking Group Winsock Generic QoS Mapping (draft)," Version 3.1, dated September 1998. Future versions of most existing operating systems are expected to provide QoS APIs and RSVP support. Usage of already available IP QoS support in the communications system 10 may be beneficial in the following ways. The air-link messaging is optimized to establish PDP sub-context. Existing message sets can be used with relatively minor modifications. Development cost and time may be reduced as standard and/or off-the-shelf software components may be used. New wireless-specific APIs do not need to be developed.

Thus, in accordance with some embodiments, a method and apparatus is provided for using RSVP signaling for admission control, resource reservation, and PDP context activation/modification (for establishing plural QoS profiles for corresponding flows), for calls between end points in the system 10. In one example, one end point may be a mobile unit coupled to the packet-based wireless network while the other end point is a circuit-switched terminal.

As further shown in FIG. 1, a home location register (HLR) 34, which contains a database of subscriber information, may also be present. The HLR 34 is managed by a cellular service provider and includes the home database for subscribers who have subscribed to a service with the cellular service provider. The HLR 34 contains a record for each home subscriber that includes location information, subscriber status, subscribed features and directory numbers. The link between the HLR 34 and the SGSN 22 is a Gr link.

A call state control function (CSCF) task 36 is also present in the communications system 10. The CSCF task 36 may reside in one of any number of platforms, such as the SGSN 22 or GGSN 24, and provides overall call control for a packet-based communications session in the wireless network. Another module is the media gateway control function (MGCF) task 38 that controls the media gateway 30. To establish a communications session between the mobile unit 12 and the circuit-switched terminal 33, the path for the control signaling includes the mobile unit 12, the radio access network 16, the SGSN 22, the GGSN 24, an MRF (multimedia resource function) task 37, the CSCF task 36, and the MGCF task 38. The path for the packet voice traffic for PSTN calls is slightly different, including the mobile unit 12, the radio access network 16, the SGSN 22, the GGSN 24, and the media gateway 30.

Some embodiments of the invention do not prevent the usage of other secondary PDP context (or PDP sub-context) activation procedures, such as those described in "Enhanced QoS Support in GPRS," Proposed Change Request Submitted to SMG, dated Sep. 30, 1999; or "Extending GPRS to Support Fine-Grained QoS," Draft submitted by AT&T Wireless System at 3GIP Meeting in Toronto, dated August 1999. However, suitable checks may be performed to avoid duplication of tasks.

Figure 2:
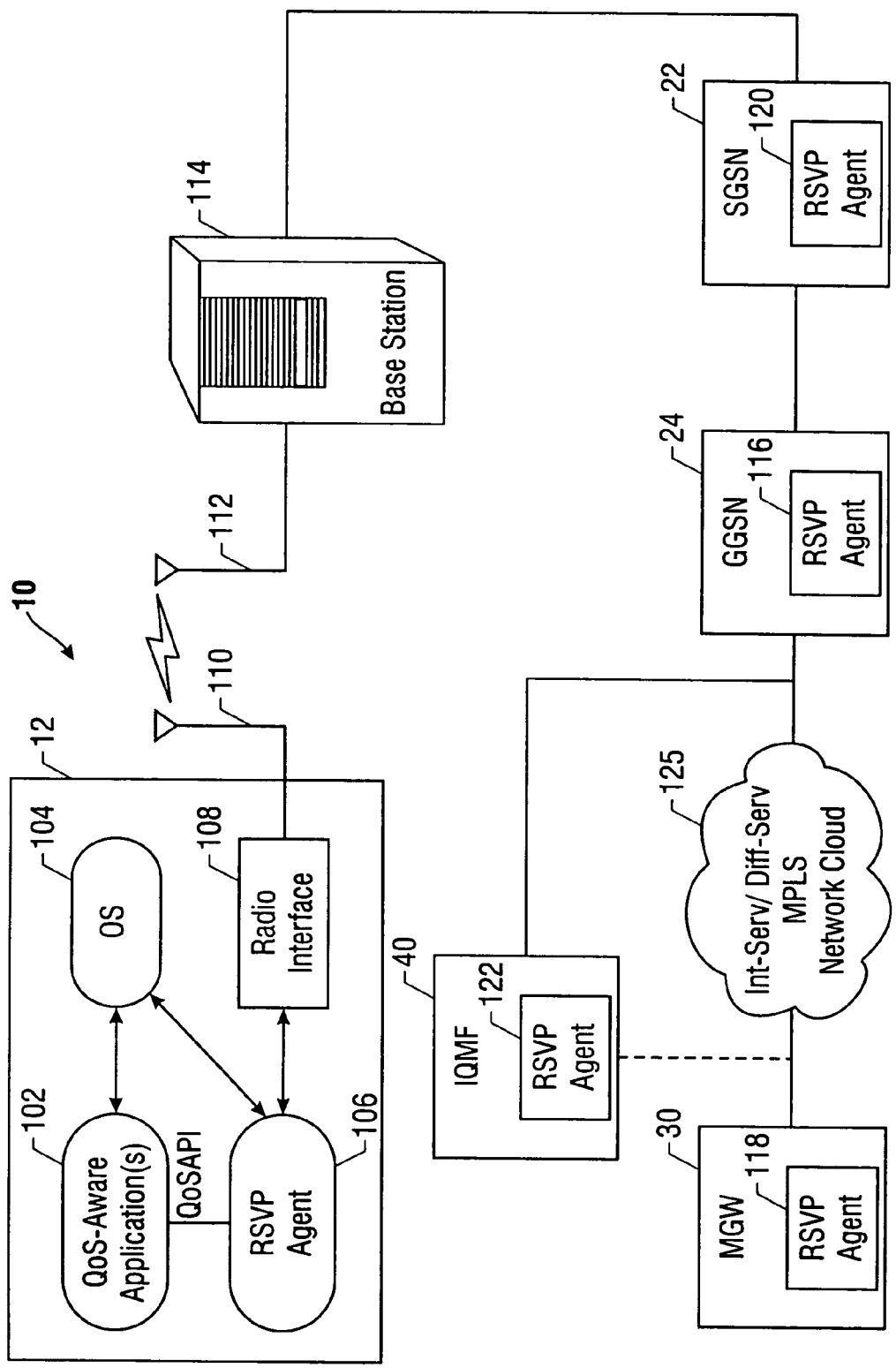
FIG. 2 is a block diagram of a portion of the communications system of FIG. 1.

Referring to FIG. 2, in accordance with one embodiment, a portion of the communications systems 10 of FIG. 1 and components in some of the network elements are illustrated. The mobile unit 12 includes one or more QoS-aware applications 102 and an operating system (OS) 104 that is RSVP-enabled. Any QoS-aware application can inform its QoS requirements and traffic profiles to an RSVP agent 106 that is part of or associated with the OS 104 using a QoS application programming interface (API) like the generic QoS (GQOS) API. The RSVP agent 106 may then generate PATH and/or RESV messages (according to RSVP). The SGSN 22 is assumed to be an RSVP-enabled router, although the GGSN 24 need not be an RSVP-enabled router. Other routers may also be in the path. Messages communicated by the mobile unit 12 are transmitted through or received by the radio interface 108, which is coupled to an antenna 110. The antenna 110 is capable of communicating radio frequency (RF) signals with an antenna 112 of a base station 114 that is part of the radio access network 16. The base station 114 communicates messages to the SGSN 22, which in turn communicates messages to the GGSN 24. The GGSN 24 is coupled through a network cloud 125 to the media gateway 30. The network cloud 125 includes various routers (not shown) that enable routing of data packets through the network cloud 125 between the GGSN 24 and the media gateway 30. The routers in the network cloud 125 may not be RSVP-enabled. The network cloud 125 may be part of the data network 20 shown in FIG. 1.

For a communications session involving a PSTN call, data traffic is communicated to the media gateway 30. In one embodiment, the media gateway 30 may include an RSVP agent 118 that is capable of processing RSVP signaling. The RSVP agent 118 in the media gateway 30 in this embodiment provides the end point for RSVP control signaling in a communications session between the mobile unit 12 and the circuit-switched terminal 33. The GGSN 24 and SGSN 22 may also include respective RSVP agents 116 and 120.

In accordance with another embodiment, instead of the end point for RSVP signaling residing in the media gateway 30, a separate QoS management module 40 may provide the end point of RSVP signaling to the circuit-switched terminal 33. The QoS management module 40 may be referred to as an IP QoS Management Function (IQMF) module in one embodiment. As shown, the IQMF module 40 is coupled to a first side of the network cloud 125 closer to the GGSN 24. In fact, the IQMF module 40 may be part of the GGSN 24. In another embodiment, the IQMF module 40 may be connected to the other side of the network cloud 125 closer to the media gateway 30 or to a point inside the network cloud 125.

The use of RSVP is for QoS signaling purposes, and is irrespective of whether Int-Serv or Diff-Serv based QoS framework or any kind of resource reservation is used within the communications system 10. The RSVP signaling is used to convey QoS information between applications in the communications system 10 for the activation of PDP sub-contexts to provide multiple QoS profiles for different flows.

The Int-Serv or Diff-Serv framework may be implemented in the network cloud 125. The Int-Serv (integrated services) framework apportions network resources based on the QoS request of an application subject to some bandwidth management policy. RSVP provides the mechanisms to perform reservation of resources in the Int-Serv framework. The Diff-Serv (differentiated services) framework is a reservation-less mechanism for providing differentiated classes of service for network traffic. To enable QoS under Diff-Serv, classifications of network traffic are provided to give preferential treatment to applications identified as having more demanding requirements. The network cloud 125 may also implement the MPLS (Muli-Protocol Label Switching) technology. MPLS adds connection-oriented mechanisms to connection-less network layer protocols.

In a communications session involving a mobile unit and a circuit-switched terminal, only one end point may support RSVP (the mobile unit). The circuit-switched terminal may not support RSVP. As a result, in such communications sessions, the RSVP end points are the mobile unit 12 and a device inside the packet-based communications system. The device may be the media gateway 30 or the IQMF module 40.

Figure 3:
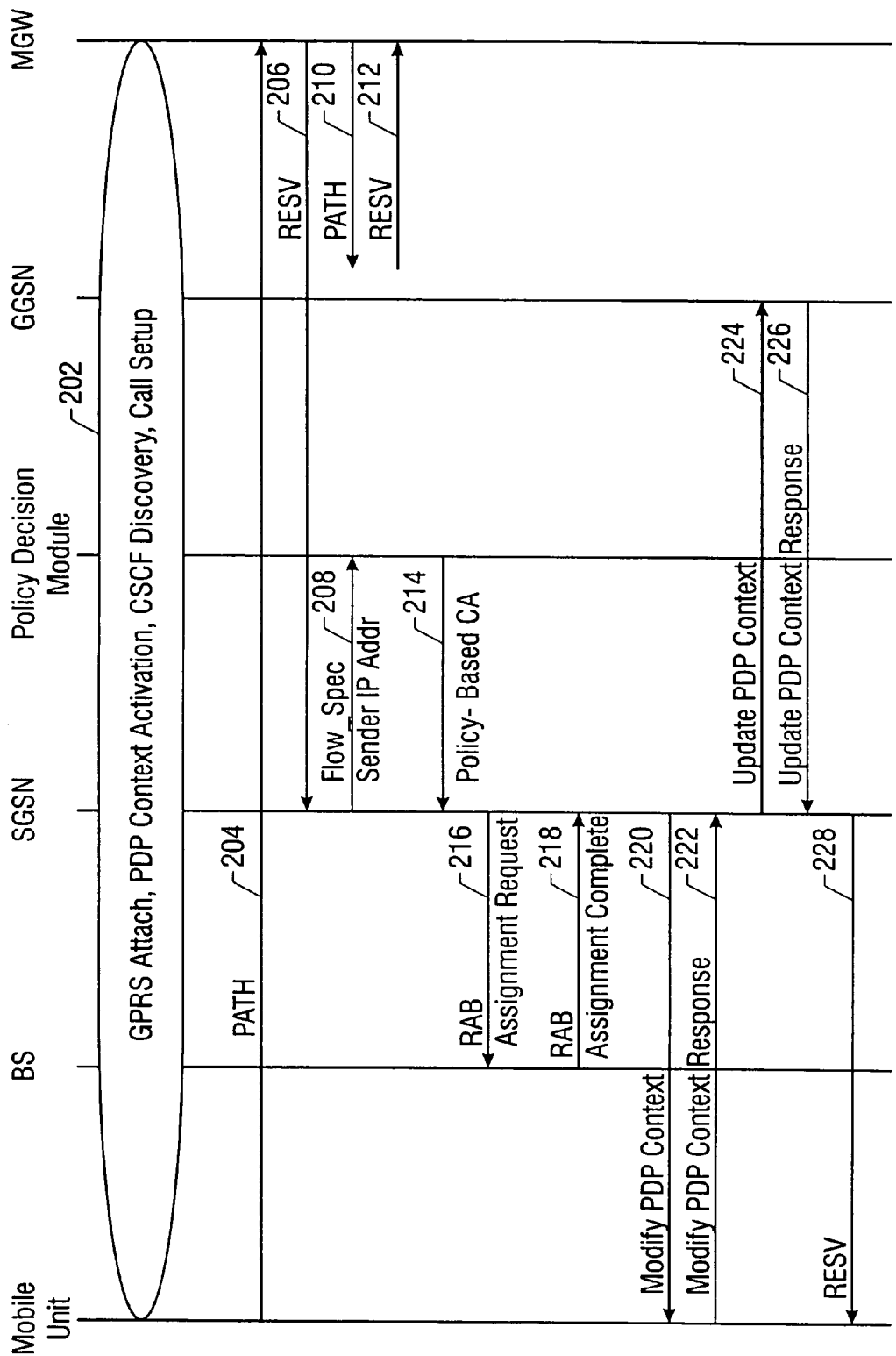
FIG. 3 is a message flow diagram for establishing a communications session having a quality of service (QoS) level in the communications system of FIG. 1 in accordance with one embodiment.

Referring to FIG. 3, the establishment of a PDP sub-context (or secondary PDP context) for a flow with a particular QoS is illustrated. In the FIG. 3 embodiment, it is assumed that the media gateway 30 is one end point for RSVP signaling. Initial setup tasks are performed (at 202), in which the mobile unit exchanges session setup messages with the CSCF task 36 and the MGCF task 38 (with the CSCF task 36 acting as a proxy). As part of the call setup, a primary PDP context having a default QoS is setup. In one example, a call session may be established using messaging according to a Session Initiation Protocol (SIP). One version of SIP is described in RFC 2543, entitled "SIP: Session Initiation Protocol," dated in 1999. In SIP, a call session is initiated by the call entity sending a SIP Invite request, followed by transmission of a SIP Ringing response to indicate that an attempt to reach the called entity is being made.

Extensions to SIP have also been proposed, including those that define messages used for negotiation and reservation confirmation prior to ringback from the called entity. For example, between Invite and Ringing, a Propose message may be communicated to indicate a specific resource reservation signaling protocol, desired audio coder/decoders (codecs), and other information. In a PSTN-terminated call, the entity processing the Invite request may be the MGCF 38, which may also generate and send the Propose message. In response to the Propose message, the calling entity may send a Commit message to identify the specific codec chosen, the reservation method chosen, and other information. Further discussion of such a negotiation mechanism is provided in Glenn Morrow, "Transaction Negotiation and Ringback Optimization Considerations," Nortel 3G. IP Contribution, dated Sep. 14, 1999, which is hereby incorporated by reference.

In one embodiment, the MGCF task 38 sends the address information of the media gateway 30 to the mobile unit (for RSVP signaling purposes). The MGCF task 38 may include this information in the PROPOSE message sent to the CSCF task 36, with the address information of the media gateway relayed to the mobile unit by the CSCF task 36. In further embodiments, other call session setup mechanisms (or setup mechanisms for other types of communications sessions) may be employed. For example, the GGSN can route the RSVP messages to the RSVP agent. This will not require the mobile station to know the IP address of the RSVP endpoint.

Next, the QoS-aware application 102 in the mobile unit provides the RSVP agent 106 with the traffic and QoS characteristics, which are used to generate (at 204) an RSVP PATH message containing the Sender_Tspec information. Sender_Tspec contains information about the traffic profile to be generated by the application 102, e.g., peak_rate, token_rate, token_bucket_size, max_sdu_size, and so forth. In this embodiment, the destination address of the PATH message is the address of the media gateway 30. The Sender_Tspec information defines the traffic characteristics of the data flow that the sender (in this case the mobile unit) will generate.

Optionally, in the PATH message, audio/video coder/decoder (codec) information may be included as an object of the Sender_Tspec information. The codec information is used to inform both ends of the communications session the codec that is to be used. Use of the codec information in the PATH message can enable end-to-end unequal voice protection on segmented access networks such as CDMA 2000, and UMTS (Universal Mobile Telecommunication System) networks. Also, if IPv4 and MPLS are employed, an MPLS flow label associated with the codec may be included in the Sender Tspec information of the PATH message to identify a flow end-to-end such that end-to-end encryption mechanisms, such as IP Security (IPSEC), may be used. The MPLS flow label still enables per-flow identification and handling of streams (e.g., use and selection of radio link transport mechanisms as well as appropriate over-the-air compression methods) end-to-end. If IPv6 is employed, however, a separate MPLS flow label is not needed as IPv6 already provides for the flow label.

The PATH message is intercepted by the RSVP-enabled routers in the path (the SGSN 22 and possibly more), each of which installs the PATH State and forwards the PATH message towards the receiver (in this embodiment the media gateway 30). The PATH state installed in the SGSN 22 may include the sender's IP address and the RSVP session information. As shown in FIG. 2, the PATH message may pass through routers in the network cloud 125 that are not RSVP-enabled.

The RSVP agent 118 in the media gateway 30 intercepts the PATH message and generates an RESV message (at 206), which contains the Flow_Spec information (including R_Spec and Receiver_Tspec). R_Spec contains information about the QoS requirements (rate and delay_slack_term) for the traffic described in Receiver_Tspec. The Receiver_Tspec is created by copying the information from the Sender_Tspec in the PATH message. The RESV message is sent back to the mobile unit.

The RSVP agent 118 in the media gateway 30 may optionally generate (at 210) a PATH message and send it to the mobile unit. The contents of this message are derived from the PATH message received from the mobile unit. Generation of this c PATH message initiates resource reservation in the opposite direction (from the media gateway 30 to the mobile unit 12). In response to the PATH message at 210, an RESV message may be returned (at 212) from the receiving end point. The RESV message (generated at 206 by the media gateway 30 in response to the PATH message from the mobile unit) traverses the network, hop by hop in the return direction. At each RSVP-enabled router, a call admission decision is made based on the Flow_Spec information contained in the RESV message. If the flow is admitted, resource is reserved for that flow in the router, and the RESV message is transmitted to the next node. Otherwise, a RESV_ERROR message is generated and is sent back to the receiver (in this embodiment the media gateway 30).

Figure 4:
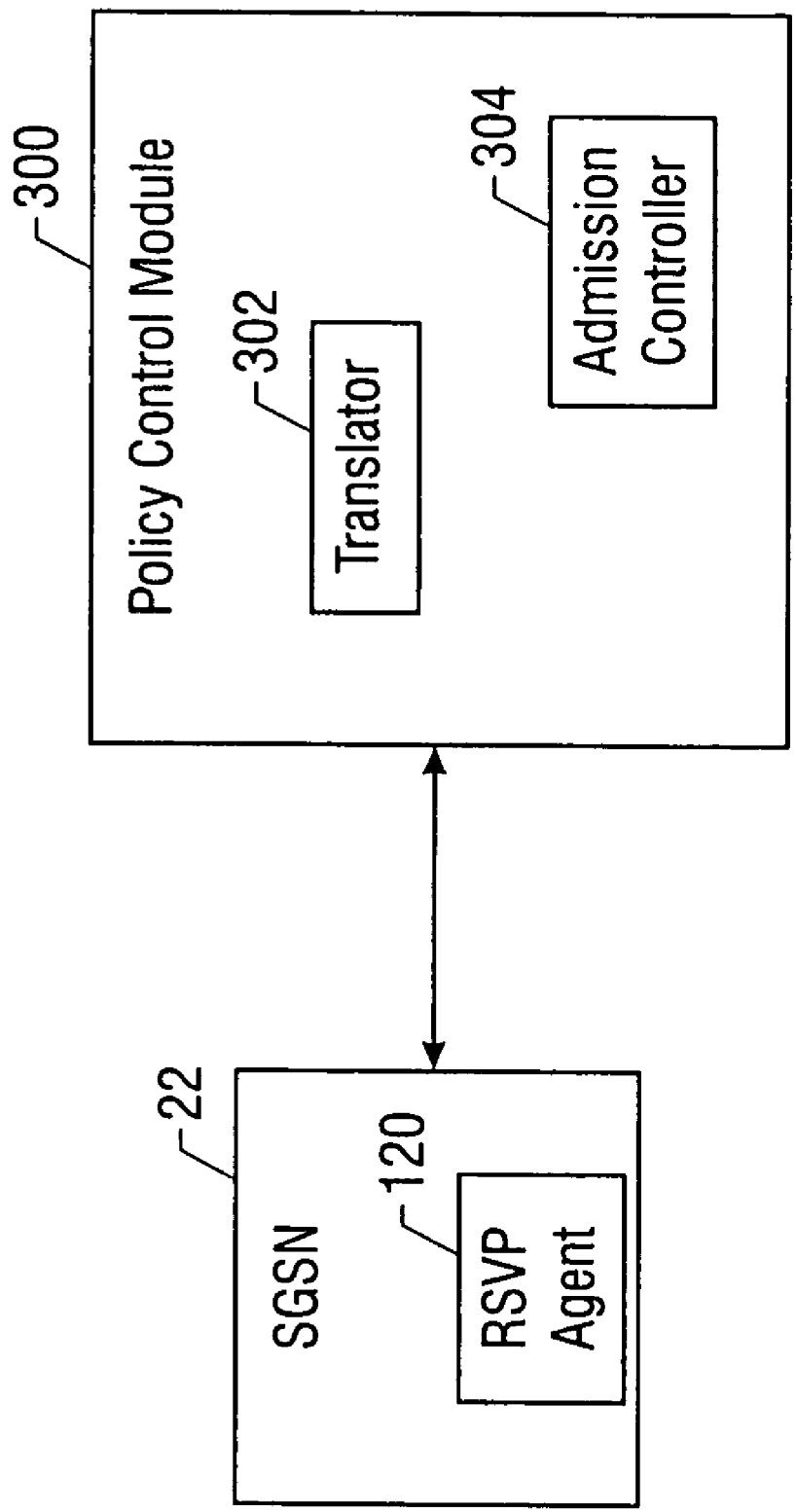
FIG. 4 illustrates components in a policy control module and serving GPRS support node that are part of the communications system of FIG. 1 in accordance with one embodiment.

The RSVP agent 120 in the SGSN 22 receives the RESV message. If the RSVP session in the RESV message matches that in the installed PATH state, the SGSN 22 makes a call admission decision based on router resources. If successful, the SGSN 22 passes (at 208) the Flow_Spec information to a translator module 302 in a policy control task 300 (FIG. 4) in accordance with one embodiment. The sender's IP address and RSVP session information are sent (at 208) to an admission controller 304, also part of the policy control task 300. The policy control task 300 may be implemented in the SGSN 22.

The responsibilities of the translator module 302 is to convert between QoS parameters of external networks (e.g., the RSVP parameters) and bearer service attributes according to UMTS. In one embodiment, the translator module 302 can map the Flow_Spec parameters to 3GIP (third generation IP) bearer attributes, as described in the 3G TR23.907 Technical Report, "3$^{rd}$ Generation Partnership Project; Technical Specification Group Services and System Aspects, QoS Concept and Architecture," Version 1.4.0, dated September 1999 (hereinafter referred to as the "3G TR23.907 Specifications"), hereby incorporated by reference. Alternatively, the Flow_Spec parameters may be used as is without translation. The translator module 302 also maps the service class information in the Flow_Spec to one of the UMTS QoS classes. The translator module 302 then passes the information to the admission controller 304.

The RSVP Flow_Spec information contains a Service_Type field specifying the class of service, namely, Best Effort, Controlled Load or Guaranteed Service. Guaranteed service provides firm (mathematically provable) bounds on end-to-end packet queuing delays. This service makes it possible to provide a service that guarantees both delay and bandwidth and is intended for applications that need a firm guarantee that a data packet will arrive no later than a certain time after it was transmitted by its source, such as in real-time communications. Controlled-load service provides the client data flow with a quality of service closely approximating the QoS that same flow would receive from an unloaded network element, but uses capacity (admission) control to assure that this service is received even when the network element is overloaded. The Best Effort service is the default QoS.

The UMTS QoS class "Background" can be mapped to the "Best Effort" service class, while the UMTS "Conversational" and "Streaming" classes can map to the "Guaranteed" class, and the "UMTS Interactive" class can map to the "Controlled Load" class. The Background class defined by UMTS refers to traffic that is the most delay insensitive traffic class. The Interactive class and Background class are assigned to traditional data network applications like web browsing, e-mail communications, file transfer and so forth. The Interactive class is used by traffic associated with interactive applications, such as text-based chat sessions, while the Background class is meant for background traffic, such as background download of e-mails or background file downloading. Conversational and Streaming classes are mainly intended to be used to carry real-time traffic flows, such as audio, video or multi-media traffic. Conversational class traffic is the most delay-sensitive, and may be used for telephony (audio, video or multi-media). On the other hand, the Streaming class traffic may be typically used for one-way audio or video real-time streams, such as when a user is looking at (or listening to) real-time video (or audio).

Based on information communicated by the translator module 302, the admission controller 304 performs a policy-based call admission decision based on subscription information (retrieved based on the sender's IP address) and the requested QoS (bearer attributes). The call admission decision is sent (at 214) to the SGSN 22.

If a new radio access bearer (RAB) is needed, the SGSN 22 sends (at 216) a radio access bearer assignment message to a resource manager in the radio access network 16 to trigger the RAB assignment/modification procedure. Completion of the RAB assignment/identification procedure is indicated by an RAB assignment complete message sent (at 218) by the radio access network 16 to the SGSN 22.

In accordance with one embodiment, once the call including the new Flow_Spec information is admitted, the SGSN 22 initiates a PDP sub-context (or secondary PDP context) activation procedure by sending (at 220) a Modify PDP Context message to the mobile unit that contains the new QoS profile as negotiated in the PATH and RESV messages discussed above. Next, the SGSN 22 receives (at 222) a Modify PDP Context response message from mobile unit. In response, SGSN 22 sends (at 224) an Update PDP Context Request message to the GGSN 24 to update—with the new QoS profile. In response, the SGSN 24 sends (at 226) an Update PDP Context Response back to the SGSN 22.

If call admission is successful, the RSVP agent 114 in the SGSN 22 forwards (at 228) the RESV message (which may be modified) to the next node in its path. If the next node in the path is the mobile unit, then the receipt of the RESV message is an indication that an end-to-end QoS path has been successfully established, and the QoS-aware application 102 can start communicating data. The reservation may fail if the next node in the path is another router. In that case, the router-generated RESV_ERROR message may trigger the PDP sub-context de-activation procedure on the part of the network.

Figure 5:
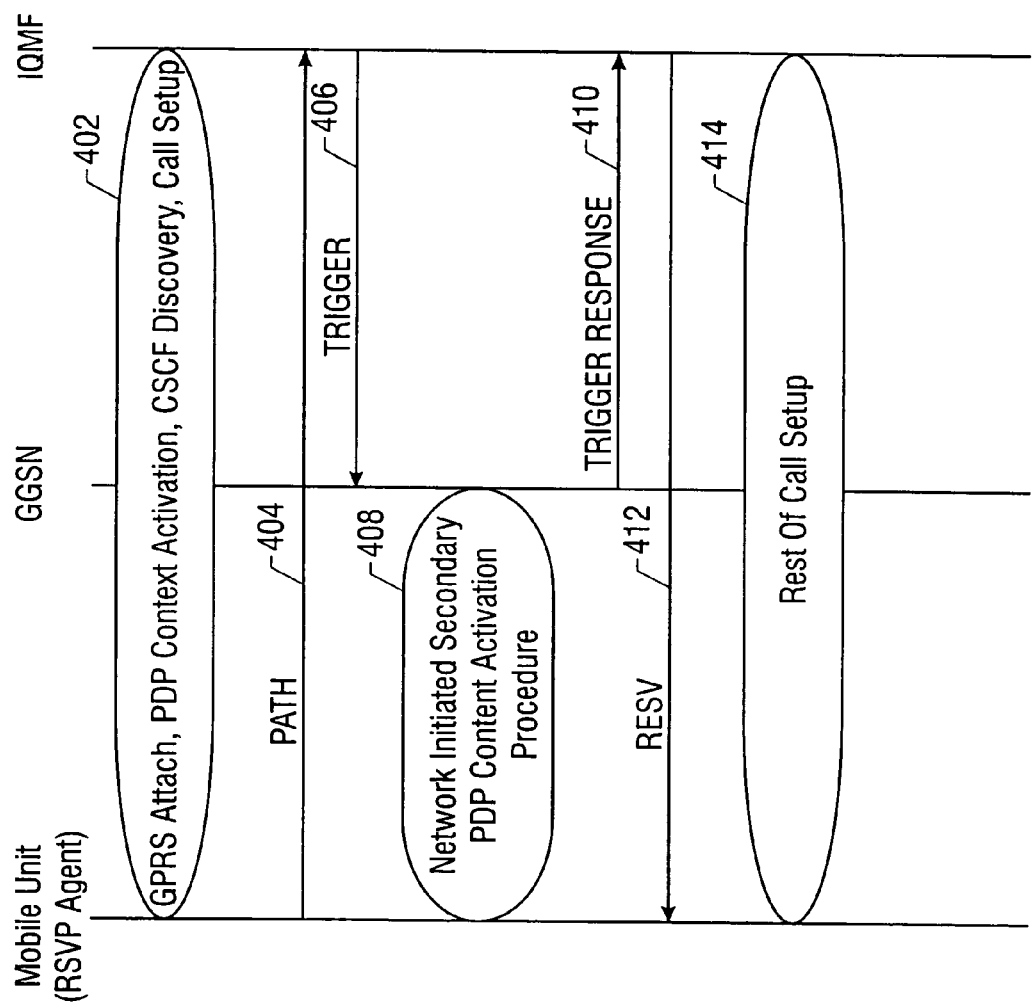
FIG. 5 is a message flow diagram for establishing a communications session having a QoS level in the communications system of FIG. 1 in accordance with a another embodiment.

Referring to FIG. 5, in accordance with an alternative embodiment, a message flow is illustrated that involves the RSVP agent 106 in the mobile unit 12, the GGSN 24, and the IQMF module 40 for activating a PDP sub-context with a different QoS profile than the default QoS profile of the primary PDP context. As in the FIG. 3 embodiment, initial setup tasks are performed (at 402) for establishing a call session. The call setup may be performed using SIP messaging. In the call setup, the CSCF module 36 (FIG. 1) may provide the IP address of the IQMF module 40 as the address of the RSVP end point. Next, the RSVP agent 106 sends (at 404) the traffic and QoS characteristics associated with the QoS-aware application 102 in a PATH message. The PATH message contains the Sender_Tspec information. The PATH message is intercepted by RSVP-enabled routers in the path between the mobile unit 12 and the IQMF module 40. The RSVP agent 122 in the IQMF module 40 receives the PATH message and extracts the Filter_Spec information of the sender, which includes the IP address and the UDP/TCP port identifier. The resource requirement, in the form of service class in Sender_Tspec, is also extracted. Based on the processing performed in the IQMF module 40, the IQMF module 40 sends (at 406) a trigger indication to the GGSN 24 to cause the GGSN 24 to perform a network-initiated PDP sub-context activation (at 408), described further in connection with FIG. 6. Once the PDP sub-u context activation has been performed, the GGSN 24 sends (at 410) a trigger response back to the IQMF module 40. The IQMF module 40 then sends (at 412) the RESV message to the RSVP agent 106 in the mobile unit 12 along the reverse path of the PATH message (sent at 404). The rest of the call setup is then performed (at 414).

Figure 6:
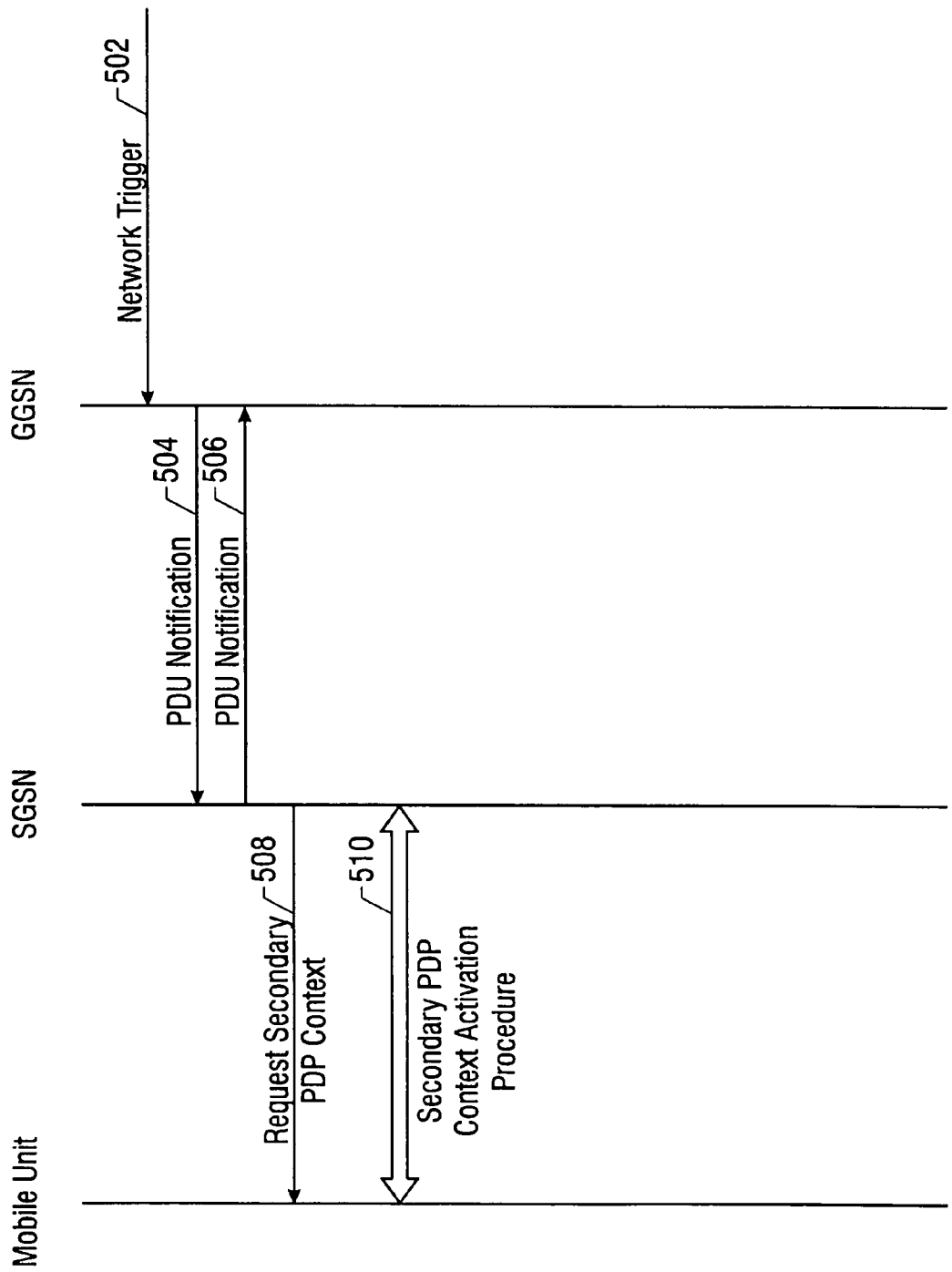
FIG. 6 is a message flow diagram for initiating a secondary Packet Data Protocol (PDP) context activation performed in establishing the communications session of FIG. 5.

Referring to FIG. 6, the network-initiated secondary PDP context activation procedure performed at 408 is illustrated in greater detail. The GGSN 24 receives (at 502) a stimulus from the external network that activation of a PDP sub-context is required for a new IP flow. This external stimulus is the trigger sent at 406 in FIG. 5. From the primary PDP context information, the GGSN 24 can determine the SGSN currently serving the mobile unit 12.

Next, the GGSN 24 sends a PDU Notification request (at 504) to the SGSN 22. The PDU Notification request may contain the QoS requirement information. The SGSN 22 then sends (at 506) a PDU Notification response to the GGSN 24 to acknowledge that it will request that the mobile unit 12 activate the PDP sub-context.

Next, the SGSN 22 sends (at 508) a Request PDP sub-context activate message, containing QoS parameters, TFT (traffic flow template) and other information to the mobile unit 12. The mobile unit may modify the QoS parameters TFT, and so forth specified in the request secondary PDP context activate message from the SGSN 22. Further messaging is exchanged (at 510) to establish the PDP sub-context between the mobile unit 12 and the SGSN 22, which may include an Activate Secondary PDP Context Request sent from the mobile unit to the SGSN 22. The Activate Secondary PDP Context Request contains the desired QoS profile.

Figure 7:
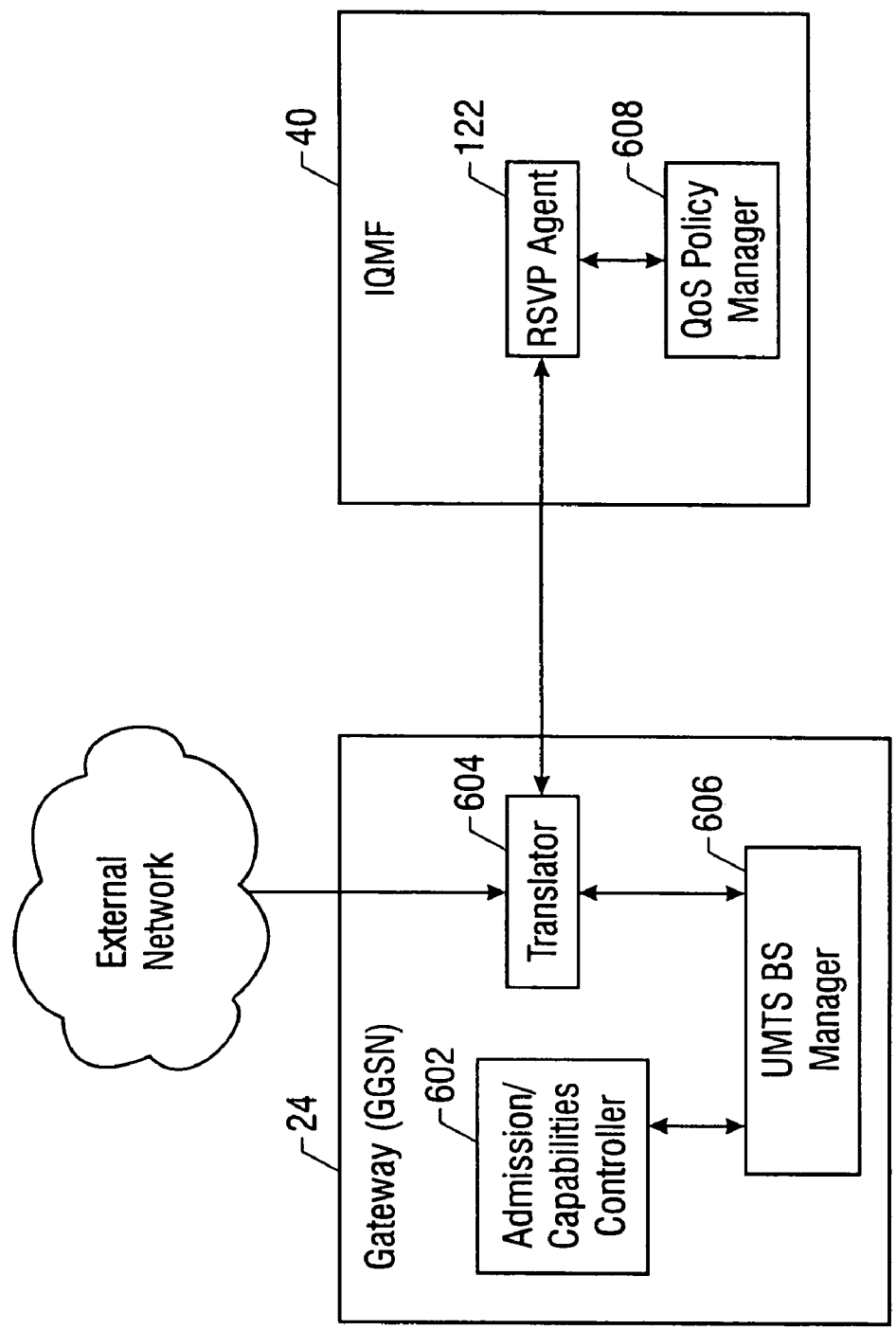
FIG. 7 is a block diagram of components in a gateway GPRS serving node and a QoS management module in the communications system of FIG. 1 in accordance with another embodiment.

Referring to FIG. 7, the components of the GGSN 24 and the IQMF module 40 in accordance with this alternative embodiment is illustrated. In this embodiment, the GGSN 24 includes an admissions/capability controller 602 that maintains the information about available resources of a network entity and all resources allocated to the UMTS bearer services. The GGSN 24 also includes a translator module 604 that converts between QoS parameters according to an external network protocol (e.g., RSVP) and internal service primitives for UMTS bearer service attributes. A UMTS base station (BS) manager in the GGSN 24 communicates through the translator module 604 with external instances of the UMTS BS manager in the mobile unit 12 and SGSN 22 to establish or modify a UMTS bearer service. The UMTS BS manager 606 queries the admissions/capabilities controller 602 whether the network entity supports the specific requested service and whether the required resources are available. The IQMF module 40 includes the RSVP agent 122 and a QoS policy manager 608.

A method and apparatus is provided to provide for one or more desired QoS profiles in corresponding one or more flows in a communications session established between a mobile unit and a terminal coupled to a circuit-switched network. RSVP signaling, or signaling according to other protocols for reserving network resources, may be utilized to initiate activation of different QoS profiles. The QoS profiles may be defined by secondary PDP contexts (or PDP sub-contexts). This enables the selection of a QoS profile to fit the needs of different applications, such as applications in the mobile unit. For example, e-mail or web browsing applications in the mobile unit may have lower QoS requirements than applications providing for communications of streaming data, such as audio, video, or multimedia communications.

The various software routines, modules, or tasks described herein may be executable on various control units. Each control unit may include a microprocessor, a microcontroller, a processor card (including one or more microprocessors or microcontrollers), or other control or computing devices. As used here, a "controller" may include hardware, software, or a combination of both.

The storage device may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software layers, routines or modules in the various network elements may be stored in respective storage devices. The instructions when executed by a respective control unit cause the corresponding network element to perform programmed acts.

The instructions of the software layers, routines, or modules may be transported to the network element in one of many different ways. For example, code segments including instructions stored on floppy disks, CD or DVD media, a hard disk, or transported through a network interface card, modem, or other interface device may be loaded into the system and executed as corresponding software layers, routines, or modules. In the loading or transport process, data signals that are embodied in carrier waves (transmitted over telephone lines, network lines, wireless links, cables, and the like) may communicate the code segments, including instructions, to the network element. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of establishing a communications session between a mobile unit and a terminal coupled to a circuit-switched network, wherein the communications session is associated with a primary Packet Data Protocol context, the method comprising:
   receiving a Resource Reservation Protocol (RSVP) PATH message originated by the mobile unit, the RSVP PATH message containing information related to reserving network resources:
   receiving a second message generated in response to the RSVP PATH message from a device designated as a terminating device for quality of service signaling on behalf of the terminal coupled to the circuit-switched network; and
   sending an indication to the mobile unit to establish a secondary Packet Data Protocol (PDP) context in response to the second message from the device, the secondary PDP context identifying a quality of service for the communications session.

2. The method of claim 1, further comprising setting up a communications session over a network including a packet-based wireless network between the mobile unit and terminal.

3. The method of claim 1, wherein receiving the second message from the device includes receiving a message from a media gateway.

4. The method of claim 1, wherein receiving the second message from the device includes receiving a message from a QoS management module.

5. The method of claim 1, further comprising receiving another message originated by the mobile unit that contains information related to reserving network resources having a different quality of service.

6. The method of claim 1, wherein receiving the message originated by the mobile unit includes receiving a message containing information associated with a first QoS-aware application running in the mobile unit.

7. The method of claim 1, wherein sending the indication to establish the context is performed by a serving GPRS support node.

8. The method of claim 1, wherein sending the indication to establish the context is performed by a gateway GPRS support node.

9. The method of claim 1, wherein receiving the second message from the device designated as the terminating device includes receiving a Resource Reservation Protocol RESV message.

10. The method of claim 1, wherein the terminal is a circuit-switched terminal,
wherein receiving the second message comprises receiving the second message from the device designated as a terminating device for quality of service signaling on behalf of the circuit-switched terminal.

11. A method of establishing a communications session between a mobile unit and a terminal coupled to a circuit-switched network, wherein the communications session is associated with a primary Packet Data Protocol context the method comprising:
receiving a Resource Reservation Protocol (RSVP) PATH message originated by the mobile unit, the RSVP PATH message containing information related to reserving network resources;
receiving a RSVP RESV message from a device designated as a terminating device for quality of service signaling on behalf of the terminal that is coupled to the circuit-switched network; and
sending an indication to the mobile unit to activate a secondary Packet Data Protocol context in response to the RSVP RESV message from the device identifying a quality of service for the communications session.

12. A method of establishing a communications session between a mobile unit and a terminal coupled to a circuit-switched network wherein the communications session is associated with a primary Packet Data Protocol context, the method comprising:
receiving a Resource Reservation Protocol PATH message originated by the mobile unit, wherein the PATH message contains information associated with a first QoS-aware application running in the mobile unit;
receiving a message responsive to the PATH message from a device designated as a terminating device for quality of service signaling on behalf of the terminal that is coupled to the circuit-switched network; and
sending an indication to establish a secondary Packet Data Protocol context in response to the message from the device identifying a quality of service for the communications session; and
receiving a second PATH message originated by the mobile unit that contains information associated with a second QoS-aware application for reserving network resources having a different quality of service.

13. An article including one or more machine-readable storage media containing instructions for establishing communications, the instructions when executed causing a mobile unit to:
establish a communications session with a remote terminal connected to a circuit-switched network, the communications session associated with a primary context providing for a first quality of service level;
send a Resource Reservation Protocol (RSVP) PATH message that identifies a traffic profile of a flow in the communications session; and
receive a network-generated indication to establish a secondary context for the flow that provides a second, different quality of service level, the network-generated indication being responsive to the RSVP PATH message that identifies the traffic profile.

14. An article including one or more machine-readable storage media containing instructions for establishing a flow having a quality of service, the instructions when executed causing a mobile unit to:
establish a communications session with a remote terminal connected to a circuit-switched network, the communications session associated with a primary Packet Data Protocol context;
send a resource reservation message different from a context activation message sent by the mobile unit to activate a Packet Data Protocol context, the resource reservation message identifying a traffic profile of the flow; and
receive a network-generated indication to establish a secondary Packet Data Protocol context of the flow that provides a quality of service level.

15. The article of claim 14, wherein the instructions when executed cause the mobile unit to further establish another secondary Packet Data Protocol context that provides another quality of service level.

16. The article of claim 15, wherein the instructions when executed cause the mobile unit to further perform different quality of service flows using the quality of service levels provided by the secondary Packet Data Protocol contexts.

17. The article of claim 14, wherein the resource reservation message comprises a Resource Reservation Protocol (RSVP) PATH message.

18. The article of claim 14, wherein the established secondary Packet Data Protocol context of the flow is of the flow in the communications session.

19. A system for use in a communications network having a packet-based wireless network and a circuit-switched network, comprising:
a controller adapted to establish a communications session having a first quality of service between a mobile unit linked to the packet-based wireless network and a terminal linked to the circuit-switched network, the first quality of service defined in a primary Packet Data Protocol context,
the controller adapted to further receive, from the mobile unit, a resource reservation message different from a context activation message sent by the mobile unit to activate a Packet Data Protocol context, the resource reservation message containing information pertaining to quality of service, and the controller to send an indication to the mobile unit to create a secondary Packet Data Protocol context defining a second, different quality of service.

20. The system of claim 19, wherein the controller is adapted to communicate resource reservation signaling with a module associated with the terininal.

21. The system of claim 20, wherein the module is part of a media gateway to the circuit-switched network.

22. The system of claim 20, wherein the resource reservation signaling includes a Resource Reservation Protocol RESV message.

23. The system of claim 20, wherein the resource reservation message from the mobile unit includes a Resource Reservation Protocol PATH message.

24. The system of claim 23, wherein the PATH message contains Sender_Tspec information having a field to identify a codec.

25. The system of claim 23, wherein the PATH message contains Sender_Tspec information having an MPLS flow label to identify an end-to-end flow.

26. The system of claim 23, wherein the PATH message contains Sender_Tspec information having an IPv6 flow label.

27. The system of claim 19, wherein the primary Packet Data Protocol context is associated with the communications session, and the second Packet Data Protocol is for a flow in the communications session.

28. An article including one or more machine-readable storage media containing instructions for setting up communications in a communications system having a packet-based wireless network and a circuit-switched network, the instructions when executed causing a controller to:
    establish a communications session between a mobile unit linked to the packet-based wireless network and a terminal connected to the circuit-switched network having plural flows with corresponding plural quality of service levels, wherein the communications session is associated with a primary Packet Data Protocol context having a first quality of service;
    receive, from the mobile unit, a resource reservation message different from a context activation message sent by the mobile unit to activate a Packet Data Protocol context; and
    send an indication to the mobile unit to establish a secondary Packet Data Protocol context having a second, different quality of service.

29. A method of establishing a communications session between a mobile unit and a terminal coupled to a circuit-switched network, comprising:
    receiving a Resource Reservation Protocol (RSVP) PATH message originated by the mobile unit, the RSVP PATH message containing information related to reserving network resources;
    receiving a second message generated in response to the RSVP PATH message from a device designated as a terminating device for quality of service signaling on behalf of the terminal coupled to the circuit-switched network;
    sending an indication to the mobile unit to establish a context in response to the second message from the device identifying a quality of service for the communications session, and
    establishing a primary context for the communications session between the mobile unit and the terminal, the primary context providing for a first quality of service,
    wherein sending the indication to establish the context comprises sending the indication to the mobile unit, in response to the second message, to establish a secondary context providing for a second quality of service different from the first quality of service, wherein the secondary context is established in the communications session.

30. The method of claim 29, wherein establishing the primary context comprises activating a primary Packet Data Protocol context, and
    wherein establishing the secondary context comprises establishing a secondary Packet Data Protocol secondary context.

31. The method of claim 29, wherein receiving the second message from the device designated as the terminating device comprises receiving an RSVP RESV message from the device designated as the terminating device.

32. The method of claim 31, wherein sending the indication to the mobile unit to establish the secondary context is accomplished without having to forward the RSVP RESV message to the mobile unit.

33. A method of establishing a communications session between a mobile unit and a terminal coupled to a circuit-switched network, comprising:
    receiving a first message originated by the mobile unit, the first message containing information related to reserving network resources;
    receiving a second message generated in response to the first message from a device designated as a terminating device for quality of service signaling on behalf of the terminal;
    sending an indication to establish a context in response to the second message from the device identifying a quality of service for the communications session,
    establishing a primary context for the communications session between the mobile unit and the terminal, the primary context providing for a first quality of service,
    wherein sending the indication to establish the context comprises sending the indication to establish a secondary context providing for a second quality of service different from the first quality of service,
    wherein establishing the primary context comprises activating a primary Packet Data Protocol context; and
    wherein establishing the secondary context comprises establishing a secondary Packet Data Protocol context,
    wherein sending the indication to the mobile unit comprises sending a Modify PDP Context message to the mobile unit.

34. The method of claim 33, further comprising receiving a Modify PDP Context Response message from the mobile unit.

35. The method of claim 33, wherein sending the indication further comprises sending an Update PDP Context message to one other node.

36. The method of claim 35, wherein sending the Update PDP Context message to the one other node comprises sending the Update PDP Context message from a serving GPRS support node to a gateway GPRS support node.

37. A method of establishing a communications session between a mobile unit and a terminal coupled to a circuit-switched network, comprising:
    receiving a first message originated by the mobile unit, the first message containing information related to reserving network resources;
    receiving a second message generated in response to the first message from a device designated as a terminating device for quality of service signaling on behalf of the terminal;
    sending an indication to establish a context in response to the second message from the device identifying a quality of service for the communications session;
    establishing a primary context for the communications session between the mobile unit and the terminal, the primary context providing for a first quality of service,
    wherein sending the indication to establish the context comprises sending the indication to establish a secondary context providing for a second quality of service different from the first quality of service,
    wherein establishing the primary context comprises activating a primary Packet Data Protocol context, and
    wherein establishing the secondary context comprises establishing a secondary Packet Data Protocol context; and receiving an Activate Secondary PDP Context Request message from the mobile unit to establish the secondary context, the Activate Secondary PDP Context Request message containing a quality-of-service profile for the secondary context.

38. The method of claim 32, wherein sending the indication comprises sending a Request Secondary PDP Activate message.

39. A system for use in a communications network having a packet-based wireless network and a circuit-switched network, comprising:

a controller adapted to establish a communications session having a first quality of service between a mobile unit linked to the packet-based wireless network and a terminal linked to the circuit-switched network, the first quality of service defined in a primary context, the controller adapted to further receive a message from the mobile unit containing information pertaining to quality of service, and to send an indication to the mobile unit to create a secondary context defining a second, different quality of service, wherein the indication to the mobile unit comprises a Modify PDP Context message.

40. A system for use in a communications network having a packet-based wireless network and a circuit-switched network, comprising:

a controller adapted to establish a communications session having a first quality of service between a mobile unit linked to the packet-based wireless network and a terminal linked to the circuit-switched network, the first quality of service defined in a primary context, the controller adapted to further receive a message from the mobile unit containing information pertaining to quality of service, and to send an indication to the mobile unit to create a secondary context defining a second, different quality of service, wherein the controller is adapted to further receive an Activate Secondary PDP Context message from the mobile unit, the Activate Secondary PDP Context message being responsive to the indication.

\* \* \* \* \*

UNITED STATES PATENT AND TRADEMARK OFFICE
CERTIFICATE OF CORRECTION

| | | |
|---|---|---|
| PATENT NO. | : 7,532,613 B1 | Page 1 of 1 |
| APPLICATION NO. | : 09/605800 | |
| DATED | : May 12, 2009 | |
| INVENTOR(S) | : Sanjoy Sen et al. | |

It is certified that error appears in the above-identified patent and that said Letters Patent is hereby corrected as shown below:

Column 14:
Line 56, "terininal" should be --terminal--.

Signed and Sealed this

Twenty-first Day of July, 2009

JOHN DOLL
*Acting Director of the United States Patent and Trademark Office*